United States Patent [19]
Davison

[11] Patent Number: 5,692,382
[45] Date of Patent: Dec. 2, 1997

[54] MODULAR NON-CRYOGENIC COOLED AUGER CONVEYOR ARRANGEMENT FOR CHILLING FOOD PRODUCTS, SLURRIES AND THE LIKE

[75] Inventor: Alan Davison, Lowell, Ark.

[73] Assignee: Food Processing Equipment Corp., Springdale, Ark.

[21] Appl. No.: 652,406

[22] Filed: May 23, 1996

Related U.S. Application Data

[60] Provisional application No. 60/014,898, Apr. 5, 1996.

[51] Int. Cl.$^6$ ............................................. F25D 13/06
[52] U.S. Cl. ............................. 62/63; 62/345; 62/381
[58] Field of Search ............................ 62/381, 63, 345

[56] References Cited

U.S. PATENT DOCUMENTS

| | | | |
|---|---|---|---|
| 3,587,241 | 6/1971 | Hagen | 62/63 |
| 4,697,508 | 10/1987 | Tallafus | 62/381 |
| 5,456,091 | 10/1995 | Zittel | 62/381 |

*Primary Examiner*—Ronald C. Capossela
*Attorney, Agent, or Firm*—Ronald P. Kananen

[57] ABSTRACT

In order to chill foodstuffs and the like type of material a modular chilling unit is provided with a jacketed trough through which a chilled non-cryogenic coolant such as glycol is circulated, and wherein the material to be cooled is moved along the cooled trough using an auger. The chilling unit is arranged so that it can be mounted on another so that the material is transferred from one to another under the influence of gravity and so that the length of chilling path can be suitably elongated. The troughs are each rotatably supported by a structure which allows rotation to a near inverted position wherein jets of cleaning fluid can be ejected into the interior of the trough.

4 Claims, 7 Drawing Sheets

MODULAR NON-CRYOGENIC COOLED AUGER CONVEYOR ARRANGEMENT FOR CHILLING FOOD PRODUCTS, SLURRIES AND THE LIKE

This application claims the benefit of U.S. Provisional application Ser. No. 60/014,898, filed Apr. 5, 1996.

BACKGROUND OF THE INVENTION

1. Field of the Invention

The present invention relates generally to an apparatus for chilling material such as meat, poultry, slurries or the like fluidized material which require chilling. More specifically, the present invention relates to a chilling arrangement which does not require the use of cryogenic cooling agents and which is modular in a manner which allows a number of units to be combined into a single continuous cooling arrangement for continuous cooling of a given supply of material.

2. Description of the Related Art

Cooling of meats and poultry after de-boning or the like, is often carried out in a batch process using cryogenic cooling agents such as dry-ice or the like. However, the use of such agents increases costs and suffers from the problem that it is often desirable to be able to chill food and the like as soon as possible after processing without having to leave it standing until such time as it can be accommodated in a subsequent chilling batch.

SUMMARY OF THE INVENTION

It is an object of the present invention to provide a modular chilling arrangement which can used to cool various types of material including slurries and the like, and which is modular in a manner wherein a plurality of such units can be arranged one above the other in a manner wherein they can sequentially cooperate with one another.

It is another object of the present invention to provide a chilling arrangement which enables the length of the conveyor along which chilling can be continuously carried out, to the incrementally varied by adding additional modular units.

It is a further object of the invention to provide a modular chilling unit which enables a plurality of units to be assembled in a vertical array in a manner wherein the material to be cooled can be transferred from one unit to the other thus defining a compact but very elongate chilling path.

It is yet another object the present invention to provide a modular chilling arrangement wherein a trough which forms an essential part of the auger conveyor, can be rotated to a position wherein jets of cleaning fluid can be directed into the trough in a manner which enables cleaning operations to be carried out.

A further object of the present invention is to use a pre-chilled coolant such as glycol or the like, and to circulate this coolant through a jacket provided in a trough of the conveyor arrangement and thus obviate the need for expensive and difficult to handle cryogenic material.

In brief, the above objects are achieved by a modular chilling unit which is provided with a jacketed trough through which a chilled non-cryogenic coolant such as glycol is circulated, and wherein the material to be cooled is moved along the cooled trough using an auger. The chilling unit is arranged so that it can be mounted on another so that the material is transferred from one unit to another under the influence of gravity and so that the length of chilling path can be suitably elongated. The troughs are each rotatably supported in a structure to allow them to be rotated to a near inverted position wherein jets of cleaning fluid can be ejected into the interior of the troughs in a manner which facilitates removal of any unwanted matter.

More specifically, a first aspect of the invention resides in a modular chilling unit comprising: a trough; an auger rotatably supported in the trough in a manner to convey material which is introduced at a first end of the trough to a second end of the trough, the trough being provided with an opening at the second end through which the material may fall under the influence of gravity; a cooling jacket provided in the trough for cooling a surface of the trough over which the material is conveyed; and means for forcing a low temperature fluid through the cooling jacket to cool the material being moved along the trough by the auger.

A feature of this arrangement resides in that the outer surface of the trough is insulated to prevent the formation of condensation thereon.

A further feature of the invention resides in that the trough is pivotally supported so that it can selectively rotated; the trough is connected to servo means for selective rotation through a predetermined angle to a cleaning position; and spray means for ejecting solution into the trough when the trough is rotated to the cleaning position.

A second aspect of the present invention resides in a chilling arrangement comprising: a first modular chilling unit including: a first trough; a first auger rotatably supported in the first trough in a manner to convey material which is introduced at an inlet end of the first trough to a outlet end of the first trough, the first trough being provided with a first opening at the second end through which the material may fall under the influence of gravity; a first cooling jacket provided in the first trough for cooling a surface of the first trough over which the material is conveyed; and means for forcing a low temperature fluid through the cooling jacket to cool the material being moved along the trough by the auger; and a second chilling unit including: a second trough; a second auger rotatably supported in the second trough in a manner to convey material which is introduced at an inlet end of the second trough to an outlet end of the second trough, the second trough being provided with a second opening at the second end through which the material may fall under the influence of gravity; and a second cooling jacket provided in the second trough for cooling a surface of the second trough over which the material is conveyed, the second cooling jacket being connected with the means for forcing a low temperature fluid to receive low temperature fluid therefrom; the first and second chilling units being arranged so that the inlet end of the second trough is located directly under the outlet end of the first trough so that material from the first trough can be introduced into the second trough.

Another aspect of the present invention resides in a method of chilling material comprising the steps of: introducing material into a first end of a first trough; moving the material from the first end of the first trough to a second end of the first trough using a first auger; and chilling the material moved along the first trough using a first cooling jacket which is disposed in the first trough in a manner to be in heat exchange contact with the material, and through which chilled low temperature coolant is circulated.

A further feature of this aspect resides in the additional steps of discharging the material from the first trough into a second trough through a discharge opening formed in the bottom of the first trough; moving the material along the second trough using a second auger; and chilling the material moved along the second trough using a second cooling jacket which is disposed in the second trough and through which the above mentioned chilled low temperature coolant is also circulated.

BRIEF DESCRIPTION OF THE DRAWINGS

The various objects, advantages and merits of the present invention will become more clearly appreciated as a detailed description of the preferred embodiments of the invention are given in conjunction with the appended drawings in which.

DETAILED DESCRIPTION OF THE PREFERRED EMBODIMENTS

Figure 1:
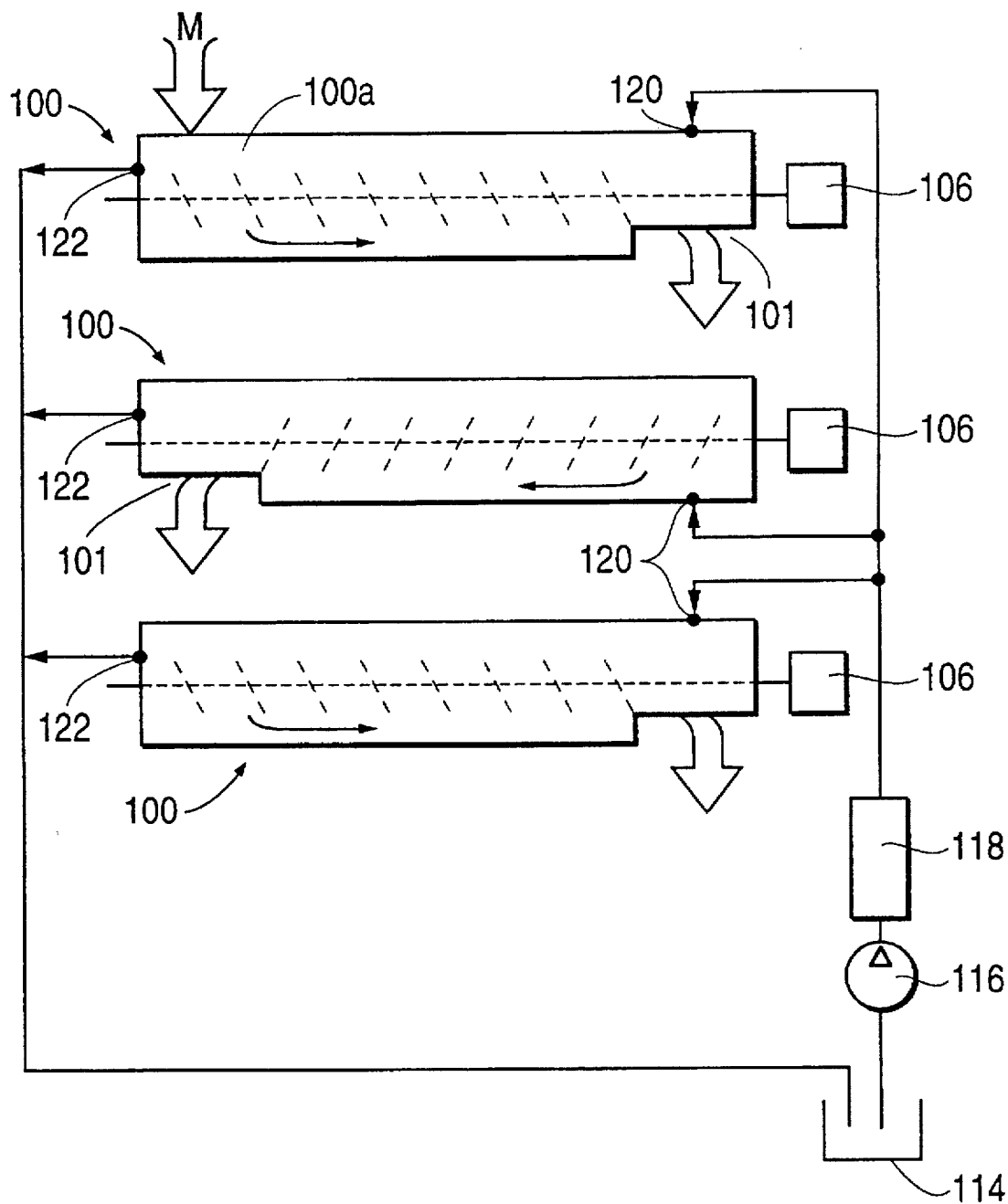
FIG. 1 is a schematic elevational view showing an array of three conveyor units depicting the manner in which the material to be chilled is transferred from one unit to the next in the array.
Figure 2:
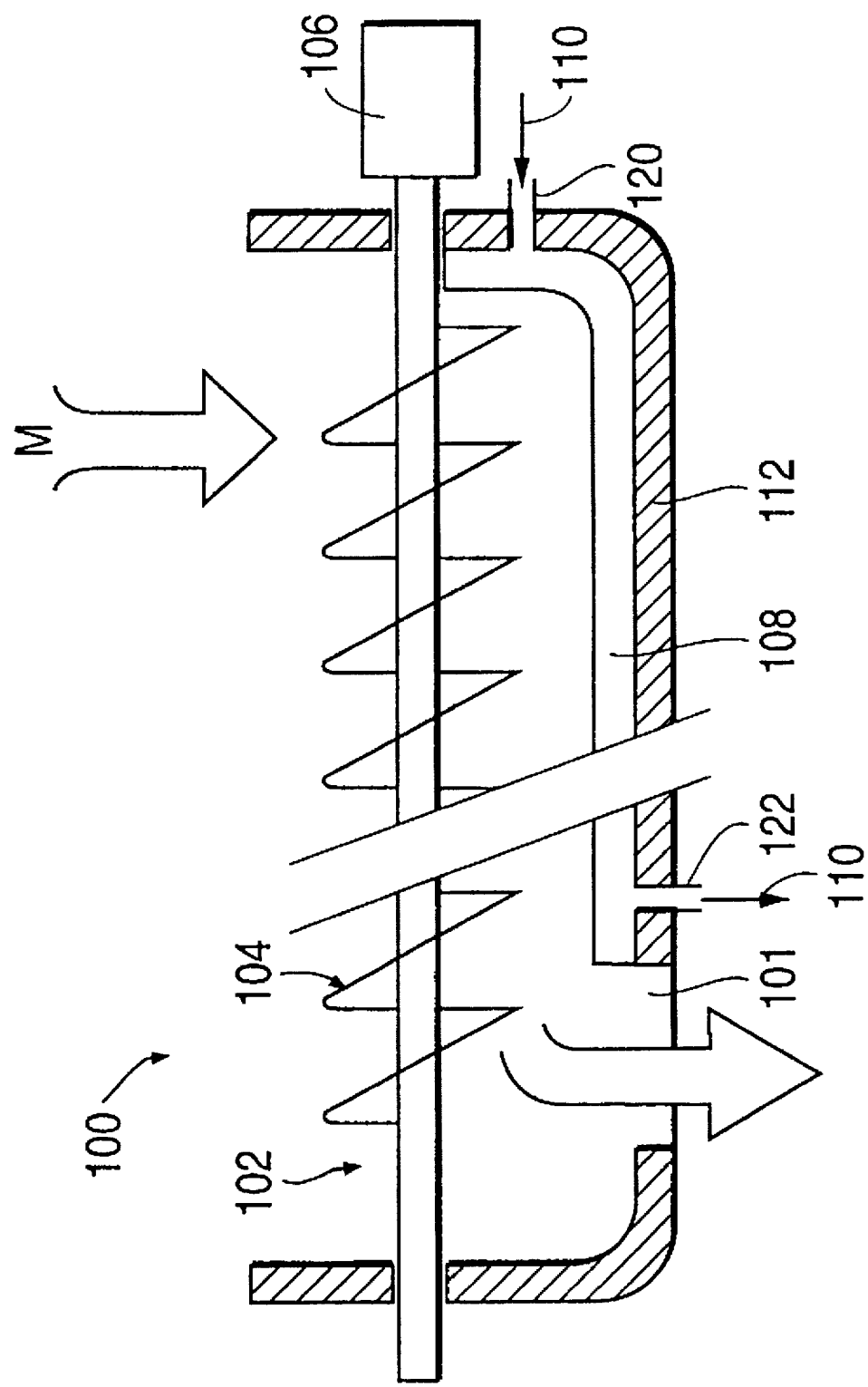
FIG. 2 is a schematic sectional view showing the manner in which the trough of the auger type conveyor is jacketed and insulated, and how the material is fed from a point of input to an exhaust port formed in the bottom of the trough.

FIGS. 1 and 2 schematically depict the basic features of the present invention. FIG. 1 shows three chilling units 100 arranged one above the other and in a manner wherein, the chilled material M from one can be discharge under the influence of gravity through an opening or exhaust port 101, into the inlet zone of the next, and so on. Each of the chilling units 100 is constructed basically in the manner depicted in FIG. 2. Each of the chilling units 100 includes a trough 102 and an auger 104 which is rotated with respect to the trough by an electric motor 106. The troughs 102 are provided with jackets 108 in a manner which allows chilled coolant 110 to be passed from one end to the other. The troughs 102 are also provided with a thermal insulating layer 112 to prevent heat transfer and to prevent the formation of condensate (water) on the external surface of the troughs 102 and thus prevent water from undesirably dripping from one trough to another. In the instance that the invention is used to chill chicken or meat products, the condensate from a higher trough would invite contamination of the product being transferred through the lower conveyor and should be prevented.

In the embodiments of the invention, the coolant takes the form of glycol which can chilled down to low temperatures without freezing and which can absorb heat from the inner surfaces of the trough in a manner suitable for chilling the material being transferred from end of the structure to the other. It is however, to be noted that while glycols are used, the present invention is not limited to this type of working fluid and that any satiable other form of working fluid can be employed as long as the desired amount of heat exchange and temperature reduction is achievable.

In FIG. 1 the glycol is induced from a reservoir 114 and pumped by pump 116 into a heat exchanger 118 wherein heat is extracted from the fluid. The chilled coolant 110 is then supplied to the jackets 108 of each of the conveyor troughs 102 through an inlet nozzle 120 and allowed to flow to a discharge nozzle 122 and then back to the reservoir 114. In the preferred embodiment of the invention, each of the troughs 102 is arranged to be pivotal in a manner which allows any residual waste to be dumped out and to facilitate cleaning of the troughs after use. Accordingly, the connection between the source of chilled glycol (pump 116 and heat exchanger 118) is achieved using either flexible hoses or by way of a suitable joint which allows relative rotation between the conduits leading from the source and the conduits connected to the trough jackets 108.

The auger 104 which moves the material along the trough is, in the disclosed embodiment of the invention, made of plastic. It should be noted that the invention is not limited to this type of material and that stainless steel or any other form of material which exhibits the required properties can be used.

Figure 3:
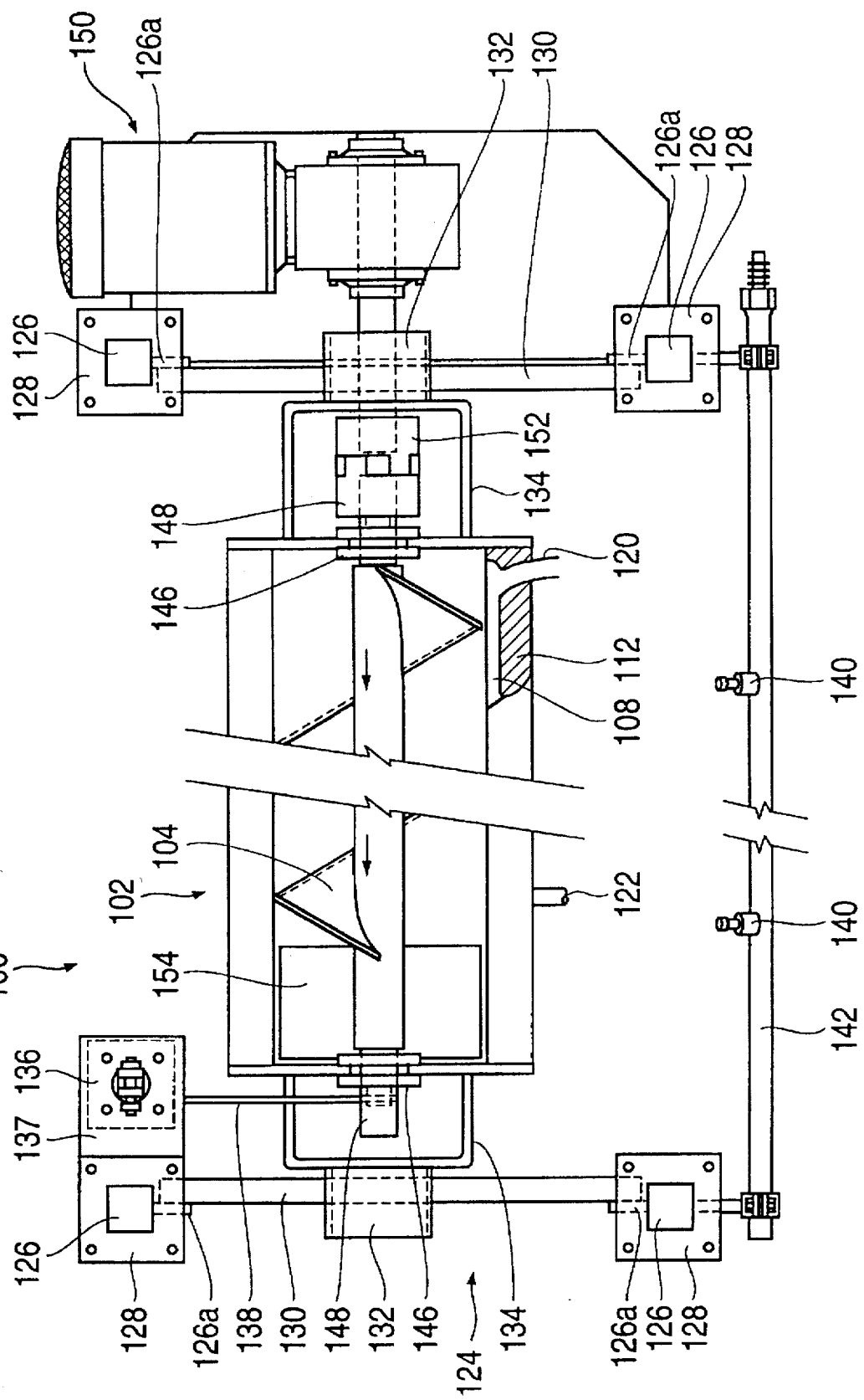
FIG. 3 is a plan view showing an embodiment of a modular chilling unit depicting the conveyor and the support structure which allows the unit to be connected to other units.
Figure 4:
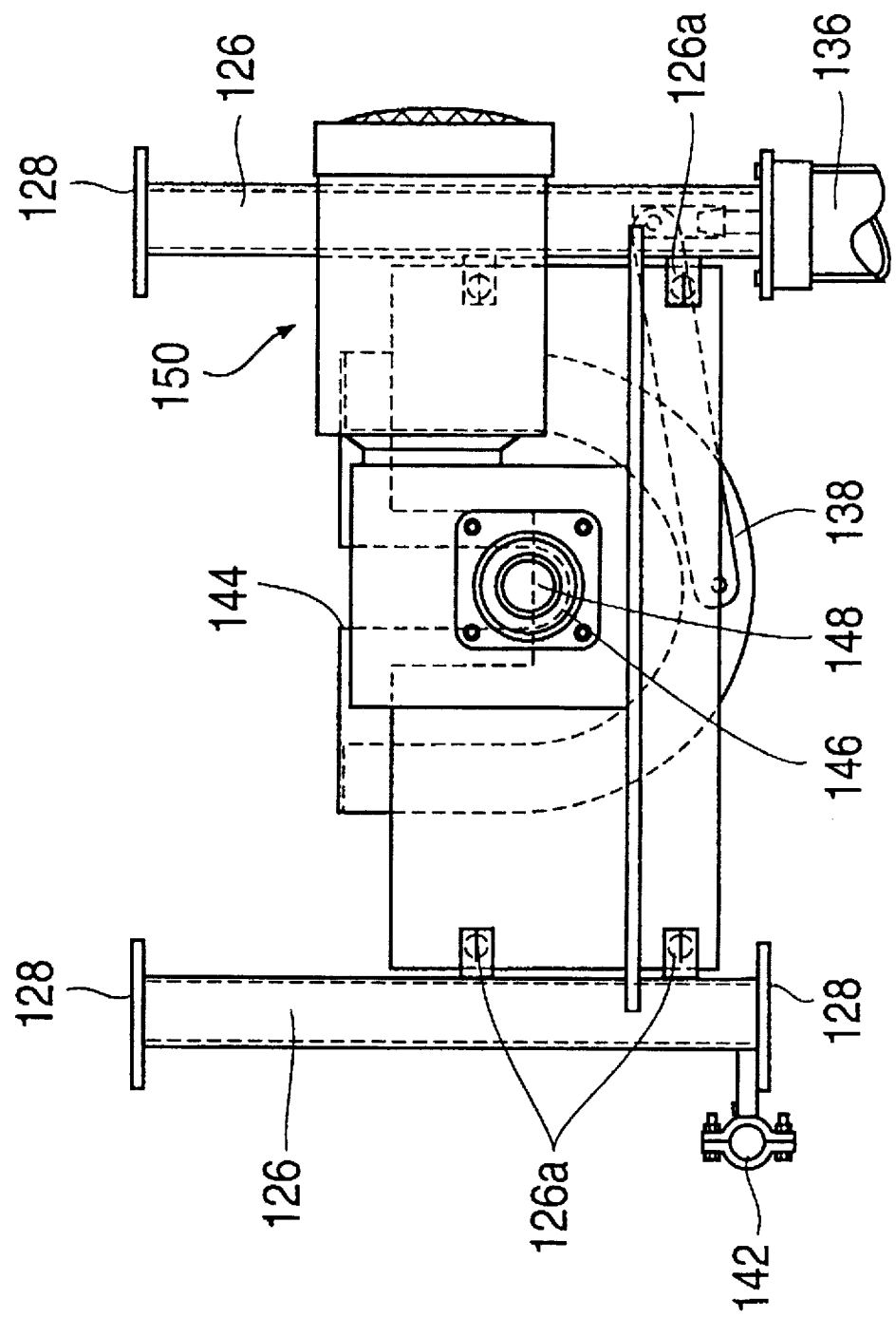
FIG. 4 is a side view showing one end of the unit shown in FIG. 3.
Figure 5:
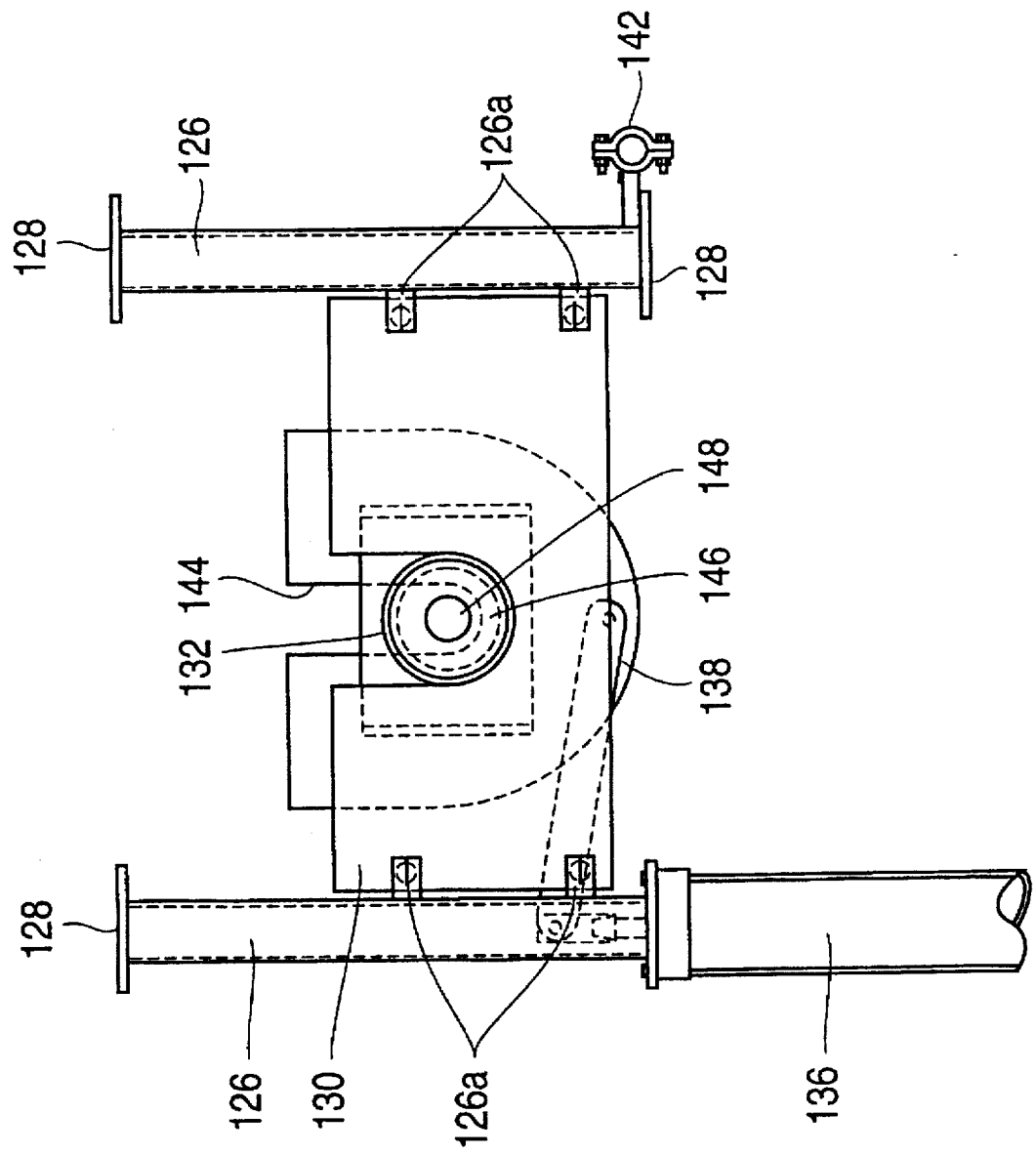
FIG. 5 is a side view showing a second end of the unit shown in FIG. 3.

FIGS. 3 to 5 show an embodiment of the invention. In this arrangement the conveyor device which comprises the trough 102 and auger 104 and is supported on a metallic support skeleton or frame 124 including four upright corner posts 126 formed of 2"×2" square tubing for example. Square connection pads 128 are formed at the tops and bottoms of each of the corner posts 126. These connection pads 128 permit one chilling unit 100 to be bolted directly to the top of another in a manner which enables the vertical array schematically depicted in FIG. 1 (for example) to be achieved.

Vertically extending side support plates 130 are bolted to brackets 126a that a welded to the corner posts 126. These side support plates 130 are aperatured in a manner which allows bearing members 132 which are rigid with the trough 102, to be rotatably supported on the support skeleton 124 and thus facilitate the rotation of the trough 102 with respect to the support skeleton 124. These bearing members 132 are rigidly connected to the trough 102 by way of rotation channels 134.

A servo device such as an air cylinder 136, is rigidly connected to the support skeleton 124 by way of an air cylinder mounting plate 137, and is operatively connected with the trough 102 through a trough rotation linkage 138. Activation of the servo (air cylinder) 136 is such as to rotate the trough 102 through an angle of about 135° to a position wherein high pressure jets of hot soapy water or the like type of cleansing solution, can be ejected from nozzles 140 into the interior of the trough 102. As will be appreciated, the conduit 142 through which the hot soapy water or the like type of cleaning or disinfecting solution is supplied to the nozzles 140, is supported on the support skeleton 124 just above two of the lower connection pads 128.

Each end of the trough 102 is provided with slots 144 which are adapted to slidingly receive support bushings 146 provided on idler shafts 148 that extend from each end of the auger 104. With this arrangement, the auger 104 can be lowered into position and then placed in drive connection with a motor and gearbox unit 150 through a suitable coupling 152. In the illustrated embodiment, this coupling 152 takes the form of a so called "love joy" coupling. This arrangement allows the auger 104 to be disconnected from the drive shaft of the motor and gearbox unit 105 and lifted out of the trough 102 for cleaning or replacement. The exhaust port 154 through which the chilled material is discharged is, in this embodiment, formed at the end of the trough 102 which is distal from the motor and gear box unit 150.

Figure 6:
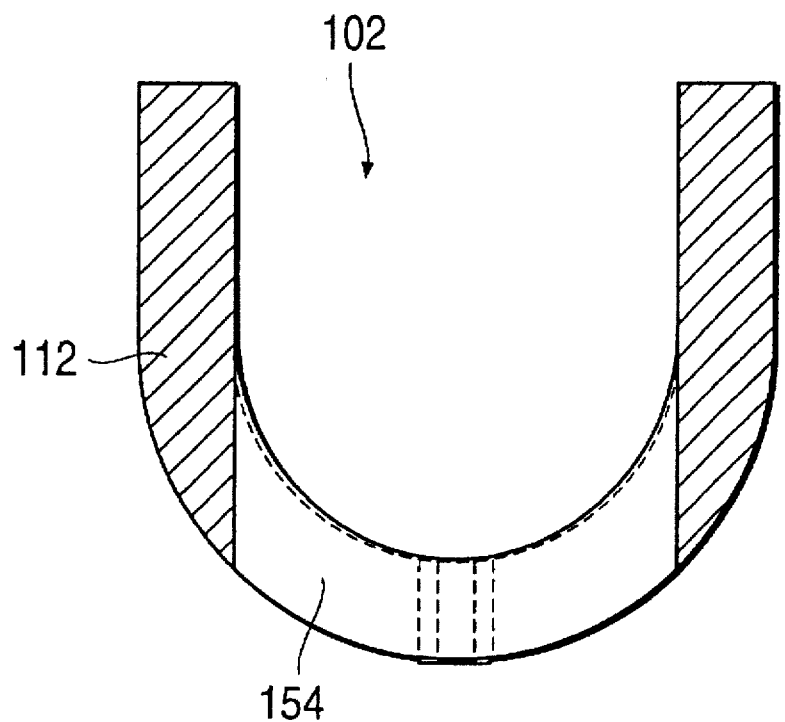
FIG. 6 is a sectional view of the trough showing the manner in which the trough is insulated to prevent the formation of condensate on the external surface and which shows the exhaust port through which the chilled material is transferred out of the chilling unit.
Figure 7:
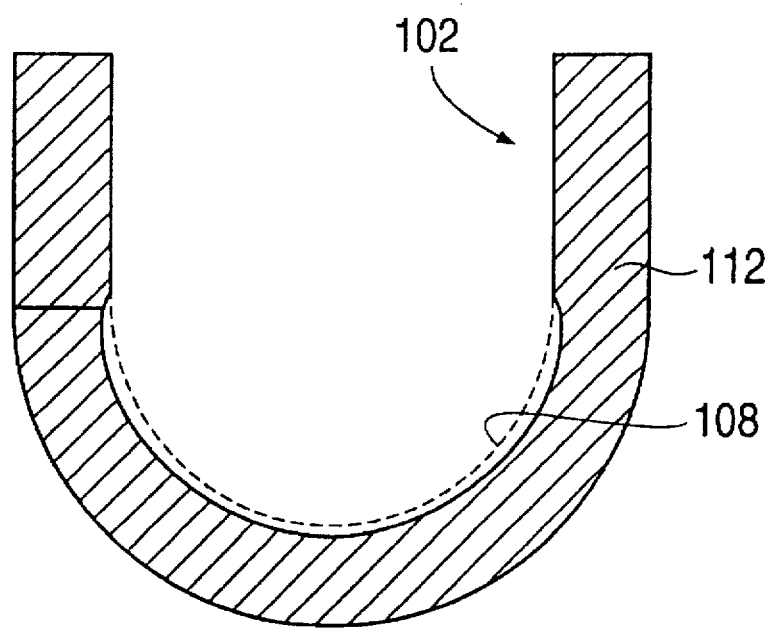
FIG. 7 is a second sectional view of the trough showing the provision of a dimple jacket on the inner wall of the trough through which the coolant is forced to circulate.

FIGS. 6 and 7 are sectional views showing constructional features of the trough 102. As will be immediately appreciated from FIG. 7, the dimple jacket 108 through which the coolant flows under pressure, is provided on the lower wall portion of the trough so as to be exposed to the minimum amount of moisture containing air during operation, and therefore minimize the risk of condensate forming out of the air and becoming entrained with the material being chilled. The remaining features are essentially self-evident from the drawings.

Figure 8:
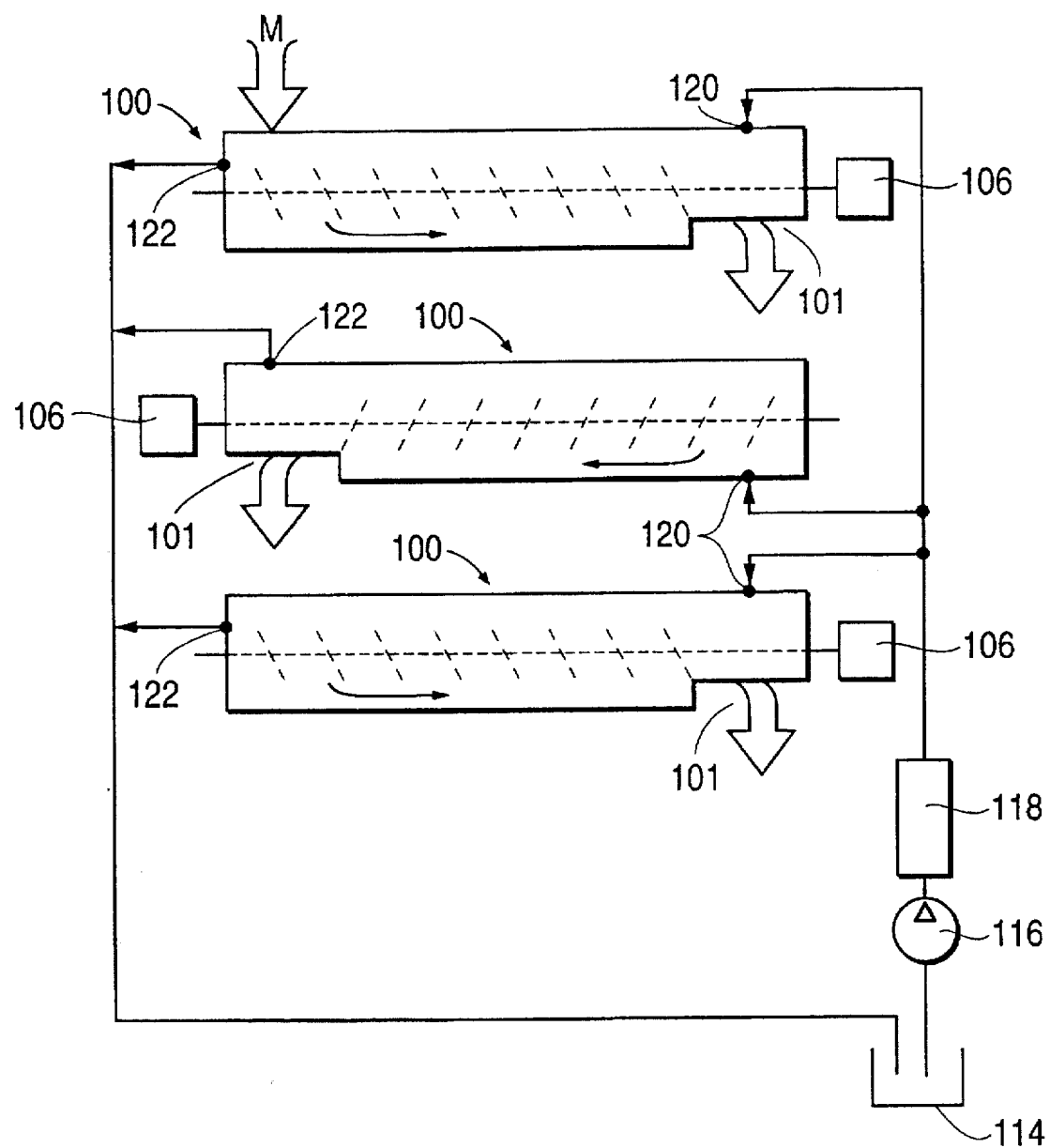
FIG. 8 is a schematic elevational view showing a variant of the arrangement depicted in FIG. 1, wherein all of the units are exactly the same and wherein the orientation of each second unit is reversed with respect to the former so that the exhaust port of each unit is arranged over the inlet end of the next trough.

FIG. 8 schematically shows a variant of the arrangement depicted in FIG. 1. This arrangement demonstrates how exactly the same chilling unit construction can be used simply by reversing the orientation of every second unit.

Although the invention has been described with reference to a only a limited number of configurations and to only one specific embodiment, it will be understood by those skill in the art to which the present invention pertains, that various changes and modifications can be made without departing from the scope of the invention which is limited only by the appended claims.

What is claimed is:

1. A modular chilling unit comprising:
   a trough;
   an auger rotatably supported in said trough in a manner to convey material which is introduced at a first end of said trough to a second end of said trough, said trough being provided with an opening at the second end through which the material may fall under the influence of gravity;
   a cooling jacket provided in said trough for cooling a surface of the trough over which the material is conveyed; and means for forcing a low temperature fluid through said cooling jacket to cool the material being moved along said trough by said auger, wherein said trough is pivotally supported so that it can selectively rotated;
   servo means operatively connected with said trough for rotating the trough through a predetermined angle to a cleaning position; and
   spray means for electing solution into said trough when said trough is rotated to the cleaning position.

2. A modular chilling unit as set forth in claim 1, wherein an outer surface of said trough is insulated to prevent the formation of condensation thereon.

3. A chilling arrangement comprising:
   a first modular chilling unit including:
      a first trough;
      a first auger rotatably supported in said first trough in a manner to convey material which is introduced at an inlet end of said first trough to a outlet end of said first trough, said first trough being provided with a first opening at the second end through which the material may fall under the influence of gravity;
      a first cooling jacket provided in said first trough for cooling a surface of said first trough over which the material is conveyed; and
      means for forcing a low temperature fluid through said cooling jacket to cool the material being moved along said trough by said auger; and
   a second chilling unit including:
      a second trough;
      a second auger rotatably supported in said second trough in a manner to convey material which is introduced at an inlet end of said second trough to an outlet end of said second trough, said second trough being provided with a second opening at the second end through which the material may fall under the influence of gravity; and
      a second cooling jacket provided in said second trough for cooling a surface of said second trough over which the material is conveyed, said second cooling jacket being connected with said means for forcing a low temperature fluid to receive low temperature fluid therefrom;
      said first and second chilling units being arranged so that the inlet end of said second trough is located directly under the outlet end of said first trough so that material from said first trough can be introduced into said second trough.

4. A method of chilling material comprising the steps of:
   introducing material into a first end of a first trough;
   moving the material from the first end of the first trough to a second end of the first trough using a first auger;
   chilling the material moved along the first trough using a first cooling jacket which is disposed in the first trough in a manner to be in heat exchange contact with the material, and through which chilled low temperature coolant is circulated, and
   further comprising the steps of: discharging the material from the first trough into a second trough through a discharge opening formed in the bottom of the first trough;
   moving the material along the second trough using a second auger; and
   chilling the material moved along the second trough using a second cooling jacket which is disposed in the second trough and through which the chilled low temperature coolant is circulated.

\* \* \* \* \*